United States Patent
Zhu et al.

(10) Patent No.: US 10,488,298 B2
(45) Date of Patent: Nov. 26, 2019

(54) APPARATUS AND SYSTEM FOR TESTING IDLE POSITION OF SERVO

(71) Applicant: UBTECH Robotics Corp., Shenzhen (CN)

(72) Inventors: Hongbo Zhu, Shenzhen (CN); Lifu Zhang, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 308 days.

(21) Appl. No.: 15/641,228

(22) Filed: Jul. 4, 2017

(65) Prior Publication Data

US 2018/0188136 A1      Jul. 5, 2018

(30) Foreign Application Priority Data

Dec. 30, 2016   (CN) .......................... 2016 1 1258835

(51) Int. Cl.
*G01M 13/02* (2019.01)
*G01B 21/22* (2006.01)
*H02P 7/28* (2016.01)

(52) U.S. Cl.
CPC ............. *G01M 13/02* (2013.01); *G01B 21/22* (2013.01); *H02P 7/28* (2013.01)

(58) Field of Classification Search
CPC ............................... G01M 13/02; G01B 21/22
See application file for complete search history.

(56) References Cited

U.S. PATENT DOCUMENTS

| 8,984,965 | B2* | 3/2015 | Matsumoto | G01M 13/025 |
| | | | | 73/862.338 |
| 2013/0154533 | A1* | 6/2013 | Lee | G01M 13/02 |
| | | | | 318/490 |
| 2014/0208863 | A1* | 7/2014 | Matsumoto | G01N 3/22 |
| | | | | 73/847 |
| 2018/0188073 | A1* | 7/2018 | Xiong | G05B 19/4065 |
| 2019/0178750 | A1* | 6/2019 | Kanke | G01M 17/007 |

FOREIGN PATENT DOCUMENTS

| CN | 201302606 | * | 2/2013 | ............ G01R 31/34 |
| CN | 106125675 | * | 11/2016 | ........... G05B 19/414 |
| CN | 106323618 | * | 1/2017 | ............ G01M 13/00 |

OTHER PUBLICATIONS

Machine Translation CN106323618 (Year: 2017).*
Machine Translation CN106125675 (Year: 2016).*
Machine Tranlation CN201302606 (Year: 2013).*

* cited by examiner

*Primary Examiner* — Natalie Huls

(57) ABSTRACT

The present disclosure is an apparatus for testing an idle position of a servo, including: driving mechanism, a transmission unit transmitting torque of a driving servo to a testing servo, and a control circuit electrically connecting to the driving servo and the testing servo to acquire idle position information. The apparatus drives the output shaft of the testing servo to rotate by an external driving mechanism, and measures an amount of rotation of the output shaft by an internal sensor of the testing servo. Therefore, an external sensor may not be provided, and a problem of precision installation of the external sensor can be avoided. Further, a problem caused by poorly install the external sensor and the output shaft can also be avoided, and accuracy of a testing result can be increased.

18 Claims, 3 Drawing Sheets

APPARATUS AND SYSTEM FOR TESTING IDLE POSITION OF SERVO

CROSS REFERENCE TO RELATED APPLICATIONS

This application claims priority to Chinese Patent Application No. 201611258835.2, filed Dec. 30, 2016, which is hereby incorporated by reference herein in its entirety.

BACKGROUND

1. Technical Field

The present disclosure generally relates to a field of a servo test, and particularly to an apparatus and a system for testing an idle position of a servo.

2. Description of Related Art

Servos are widely used, and the servos are core components of many machines. For example, the servos are power units in an intelligent robot, and the servos are key units to form joint components of the intelligent robot. Further, the servos are key units to achieve intelligence of the intelligent robot. Therefore, performance of the servos determines the performance of intelligent robots and other machines.

Idle position is an important indicator of the performance of the servos. Normally, in a test of the idle position of the servo, an output shaft of a testing servo connects to a sensor, and the sensor electrically connects to a testing circuit. In testing, the tested servo is powered on, and an internal motor of the tested servo is controlled not to rotate. Then, an output shaft of the testing servo is rotated manually until the output shaft of the testing servo cannot be rotated manually. The sensor measures an amount of the rotation of the output shaft. The testing circuit loads the amount of the rotation of the output shaft measured by the sensor to obtain idle position information. Then, the test of the idle position of the testing servo is finished.

However, a structure of a test device of the test of the idle position of the testing servo is complex, and installation quality of the testing servo and the sensor is demanding. When the installation quality is poor, a detecting result of the sensor is not accurate that results in poor test accuracy.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
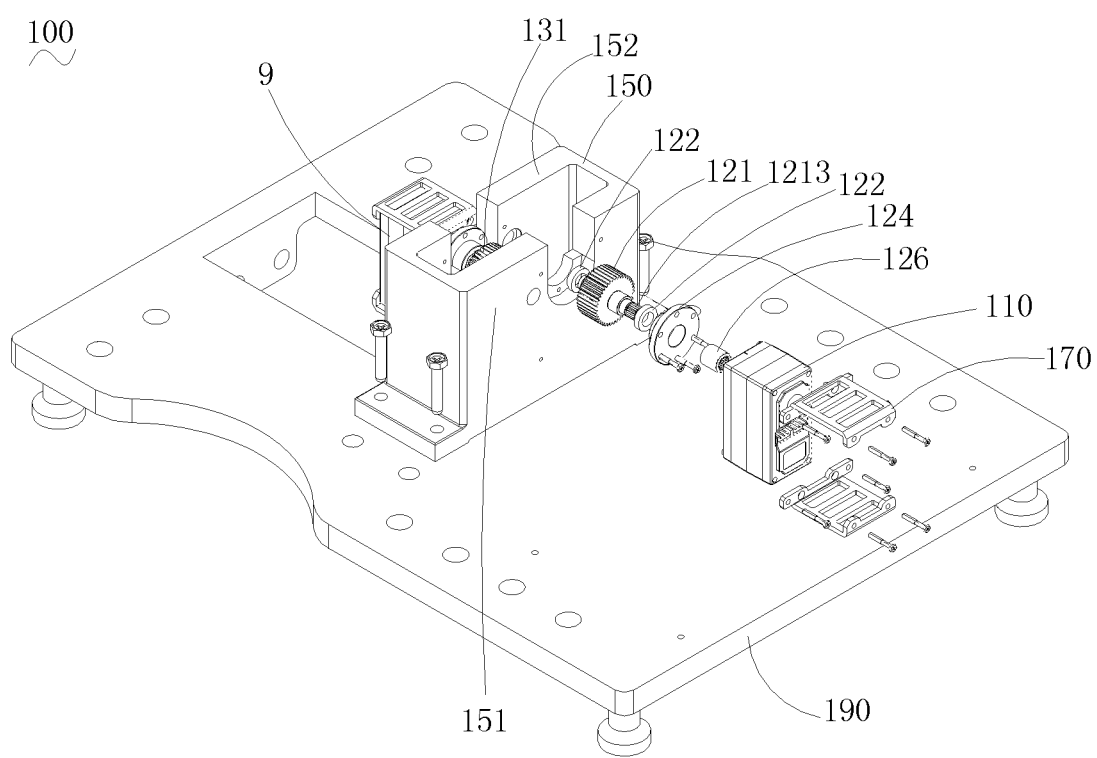
FIG. 1 is a dimensional structural diagram of an apparatus for testing an idle position of a servo of one embodiment of the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Unless there is other definition, all technical and scientific terms herein have the same meaning as commonly understood by one of ordinary skill in the art to which this invention pertains. The terminology used herein in the specification of the present disclosure is for the purpose of describing particular embodiments only and is not intended to limit the invention. The terms "and/or" as used herein includes any and all combinations of one or more of the associated listed items.

The present disclosure provides an apparatus for testing an idle position of a servo configured to test idle position information of a testing servo. A common servo includes a shell, a reducer gear set, a motor, a sensor, a main board, and an output shaft. The reducer gear set, the motor, the sensor, and the main board are mounted in the shell, and the output shaft extends out of the shell from inside of the shell. The main board may be a control circuit. When the servo is working, the main board receives control signals of a signal source, and drives the motor to rotate. The reducer gear set reduces speed of the motor with a large scaling factor, and magnifies output torque of the motor with the same large scaling factor. The sensor and final stage of the reducer gear set rotate together, and the sensor measures rotational angle of the servo. The main board determines the rotational angle of the servo according to signals measured by the sensor, and controls the servo to rotate to a target angle or to keep at the target angle.

Figure 2:
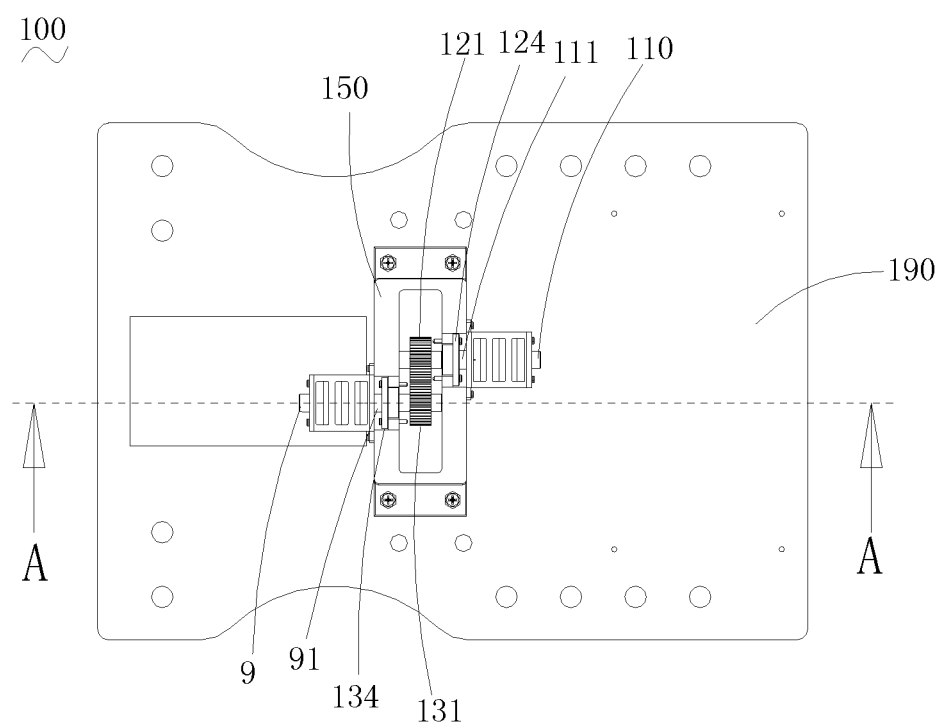
FIG. 2 is a top view of a structural diagram of the apparatus of FIG. 1.
Figure 3:
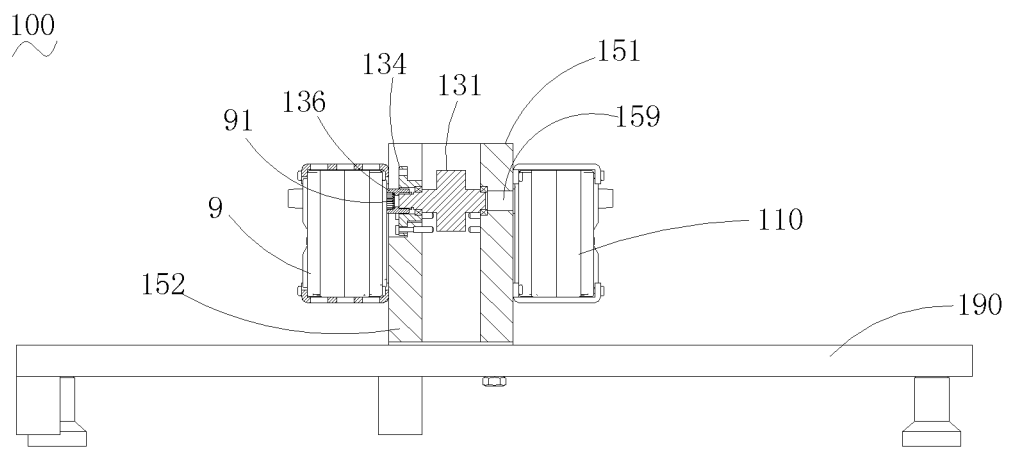
FIG. 3 is a sectional view of the A-A section in FIG. 2.

With reference to FIGS. 1 to 3, the apparatus 100 of the idle position of the servo of one embodiment of the present disclosure includes a driving mechanism and a control circuit (not shown). Specifically, the driving mechanism drives an output shaft 91 of a testing servo 9. When the testing servo 9 is tested, the output shaft 91 of the testing servo 9 connects to the driving mechanism. Therefore, the output shaft 91 of the testing servo 9 is driven to rotate by the driving mechanism.

In the embodiment, the apparatus 100 further includes a support platform 190. The support platform 190 supports the driving mechanism and the control circuit, and then the apparatus 100 can be easily moved. Specifically, the driving mechanism and the control circuit are arranged on the support platform 190. A specific structure of the support platform 190 does not have any specific limitation in the present disclosure. A person skilled in the art can reasonably set the support platform 190 according to the actual situation.

Specifically, the driving mechanism includes a driving servo 110 and a transmission unit. The driving servo 110 provides power, such as torque. The power provided by the driving servo 110 outputs from a driving shaft 111, and the driving shaft 111 is an output shaft of the driving servo 110. The transmission unit connects to the driving shaft 111, and the transmission unit transmits the torque of the driving shaft 111 to the output shaft 91 of the testing servo 9 to rotate the output shaft 91. Therefore, a test can be easily implemented on a production line. The driving servo 110 is easily acquired, and the driving servo 110 does not be damaged after the test. The driving servo 110 can be used repeatedly. Further, there is no need to find a separate power source, it is simple and convenient. Of course, it is understandable that other mechanisms may be used as power sources.

In the embodiment, the driving servo 110 is mounted on the support platform 190 through a fixing mechanism 170. Specifically, the fixing mechanism 170 includes snaps and screws. Therefore, the driving servo 110 can be firmly mounted on the support platform 190. Of course, it is understandable that a specific structure of the fixing mechanism 170 is not limited by the above structures. The fixing mechanism 170 may be any structure that can fix the driving servo 110. For example, the driving servo 110 may be fixed by an adhesive, or by welding.

In the embodiment, the transmission unit includes a driving gear 121 and a driven gear 131. The driving gear 121 engages with the driven gear 131, and the driving gear 121 drives the driven gear 131 to rotate. Namely, the driving shaft 111 of the driving servo 110 drives the driving gear 121 to rotate, the driving gear 121 drives the driven gear 131 to rotate, and the driven gear 131 drives the output shaft 91 of the testing servo 9 to rotate. Therefore, the torque of the driving shaft 111 is transmitted to the testing servo 9.

In the embodiment, the transmission unit has symmetrical structures. Namely, a structure between the driving gear 121 and the driving shaft 111 in the transmission units is same as a structure between the driven gear 131 and the output shaft 91. Therefore, the transmission of the torque can be more stable. Specifically, the structure of the transmission unit is center symmetric. Of course, it is understandable that the structure of the transmission unit may not be center symmetric, and the structure of the transmission unit can be any type so that the torque of the driving shaft 111 can be transmitted to the output shaft 91.

With reference to FIGS. 1 and 3, specifically, a head of a gear shaft of the driving gear 121 is shown in the lower right corner of the FIG. 1, and the head of the gear shaft of the driving gear 121 connects to the driving shaft 111 of the driving servo 110 through a bushing.

In the embodiment, the bushing that connects the head of the gear shaft of the driving gear 121 to the driving shaft 111 of the driving servo 110 is a spline bushing 126. Specifically, the head of the gear shaft of the driving gear 121 has a first spline 1213. An end of the driving shaft 111 of the driving servo 110 has a second spline. The spline bushing 126 has two ends. One end of the spline bushing 126 is set on the first spline 1213, and the other end of the spline bushing 126 is set on the second spline. Therefore, the head of the gear shaft of the driving gear 121 connects to the driving shaft 111 of the driving servo 110 through the bushing.

In the embodiment, the spline bushing 126 includes a first stopping step mounted in a middle of an inner wall of the spline bushing 126. The first stopping step can fix a position of the gear shaft of the driving gear 121 and the driving shaft 111 along axial directions.

Of course, it is understandable that the spline bushing 126 may not include the first stopping step. Further, the bushing that connects the head of the gear shaft of the driving gear 121 to the driving shaft 111 of the driving servo 110 is not only a spline bushing 126, but also a flat sleeve bushing.

In the embodiment, the apparatus 100 further includes a box body 150. The box body 150 receives and supports the driving gear 121 and the driven gear 131. Specifically, the box body 150 includes a first side wall 151, and a second side wall 152 opposite to the first side wall 151. The driving gear 121 pierces out the first side wall 151 to connect to the driving shaft 111, and the driven gear 131 pierces out the second side wall 152 to connect to the output shaft 91.

In the embodiment, two ends of the driving gear 121 are respectively supported by the first side wall 151 and the second side wall 152. Specifically, the head of the gear shaft of the driving gear 121 is supported by the first side wall 151, and an end of the gear shaft of the driving gear 121 is supported the second side wall 152. A gear portion of the driving gear 121 is mounted in a chamber of the box body 150 that is between the first side wall 151 and the second side wall 152.

Specifically, a first step hole is formed on the first side wall 151, and the head of the gear shaft of the driving gear 121 is supported by the first step hole. A third step hole is formed on the second side wall 152, and the end of the gear shaft of the driving gear 121 is supported by the third step hole In the embodiment, the end of the gear shaft of the driving gear 121 is supported by the third step hole through a bearing 122. The head of the gear shaft of the driving gear 121 is not supported by the first step hole through the bearing 122. A first flange 124 is mounted on the first step hole, and the head of the gear shaft of the driving gear 121 is supported by the first flange 124 through the bearing 122. The first spline 1213 pierces through and extends out of the first flange 124 to connect to the spline bushing 126.

In the embodiment, the first flange 124 is fixed on the first step hole through screws.

With reference to FIGS. 1 and 3, a head of a gear shaft of driven gear 131 is shown in the left side of the FIG. 3, and the head of the gear shaft of 131 connects to the output shaft 91 of the testing servo 9 through a bushing.

In the embodiment, the bushing that connects the head of the gear shaft of 131 to the output shaft 91 of the testing servo 9 is a spline bushing 136. Namely, the head of the gear shaft of 131 connects to the output shaft 91 of the testing servo 9 through the spline bushing 136. Specifically, the head of the gear shaft of 131 has a third spline, and an end of the output shaft 91 of the testing servo 9 has a fourth spline. The spline bushing 136 has two ends. One end of the spline bushing 136 is set on the third spline, and the other end of the spline bushing 136 is set on the fourth spline. Therefore, the head of the gear shaft of 131 connects to the output shaft 91 of the testing servo 9 through the bushing.

In the embodiment, the spline bushing 136 includes a second stopping step mounted in a middle of an inner wall of the spline bushing 136. The second stopping step can fix a position of the gear shaft of the driven gear 131 and the output shaft 91 along axial directions.

It can be understood that the spline bushing 136 may not include the second stopping step. Further, the bushing that connects the head of the gear shaft of 131 to the output shaft 91 of the testing servo 9 is not only a spline bushing 136, but also a flat sleeve bushing.

In the embodiment, two ends of the driven gear 131 are respectively supported by the first side wall 151 and the second side wall 152. Specifically, the head of the gear shaft of the driven gear 131 is supported by the second side wall 152, and an end of the gear shaft of the driven gear 131 is supported the first side wall 151. A gear portion of the driven gear 131 is mounted in a chamber of the box body 150 that is between the first side wall 151 and the second side wall 152. Namely, the driven gear 131 is mounted in parallel with the driving gear 121, but the driving gear 121 and the driven gear 131 respectively directs opposite directions.

Specifically, a second step hole is formed on the second side wall 152, and the head of the gear shaft of the driven gear 131 is supported by the second step hole. A fourth step hole 159 is formed on the first side wall 151, and the end of the gear shaft of the driven gear 131 is supported by the fourth step hole 159.

In the embodiment, the end of the gear shaft of the driven gear 131 is supported by the fourth step hole through a bearing. The head of the gear shaft of the driven gear 131 is not supported by the second step hole through the bearing. A second flange 134 is mounted on the second step hole, and the head of the gear shaft of the driven gear 131 is supported by the second flange 134 through the bearing. The third spline pierces through and extends out of the second flange 134 to connect to the spline bushing 136.

In the embodiment, the second flange 134 is fixed on the third step hole through screws.

In the embodiment, in order to conveniently mount the driving gear 121 and the driven gear 131 on the box body 150, the box body 150 does not provide a top cover, or the box body 150 provides a top cover that can be detachably mounted on the box body 150. The first step hole and the second step hole are U-shaped. Namely, the first step hole and a top of the first side wall 151 are perforated. Therefore, the driving gear 121 can be mounted from the top of the first side wall 151 to a bottom of the first step hole. Similarly, the second step hole and a top of the second side wall 152 are perforated. Therefore, the driven gear 131 can be mounted from the top of the second side wall 152 to a bottom of the second step hole. The driven gear 131 is also conveniently mounted.

The control circuit electrically connects a motor of the driving servo 110, and controls the driving servo 110 to rotate. The control circuit further electrically connects to an internal sensor of the driving servo 110, and an internal sensor of the testing servo 9. Therefore, the control circuit can load angle information from the internal sensors of the driving servo 110 and the testing servo 9.

The operation of the apparatus 100 of the idle position of the servo is described below.

At first, the output shaft 91 of the testing servo 9 inserts into the spline bushing 136 to receive the torque provided by the apparatus 100. The internal sensor of the testing servo 9 electrically connects to the control circuit. Then, the control circuit drives the driving shaft 111 of the driving servo 110 to rotate forward. When the internal sensor of the testing servo 9 detects that the output shaft 91 of the testing servo 9 is rotating, the driving servo 110 rotates continuously for a preset time period to drive the motor of the testing servo 9 to rotate. Then, the driving servo 110 stops rotating. The control circuit reads an angle A1 of the driving shaft 111 of the driving servo 110 from the internal sensor of the driving servo 110. The control circuit further drives the driving servo 110 to rotate backward with torque that is less than the torque of forward rotation. When the driving shaft 111 of the driving servo 110 cannot rotate continuously, the control circuit reads an angle A2 of the driving shaft 111 of the driving servo 110 from the internal sensor of the driving servo 110. Idle information is calculated by determining an absolute value of subtracting A1 from A2.

The apparatus 100 of the idle position of the servo drives the output shaft of the testing servo to rotate by an external driving mechanism, and measures an amount of rotation of the output shaft by an internal sensor of the testing servo. The idle position of the testing servo can be tested. Therefore, an external sensor may not be provided, and a problem of precision installation of the external sensor can be avoided. Further, a problem caused by poorly install the external sensor and the output shaft can also be avoided, and accuracy of a testing result can be increased.

The present disclosure further provides a testing system of an idle position of a servo.

The testing system includes a testing servo and the apparatus 100 provided by the present disclosure. An output shaft of the testing servo connects to the driving mechanism of the apparatus 100. A motor and inner sensors of the testing servo electrically connects to the control circuit of the apparatus 100.

The testing system includes the apparatus 100 provided by the present disclosure. Therefore, the testing system can be easily installed, and have higher accuracy of a testing result.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An apparatus for testing an idle position of a servo, comprising:
    a driving mechanism configured to connect to an output shaft of a testing servo, and to drive the output shaft of the testing servo to rotate; wherein the driving mechanism comprises a driving servo having a driving shaft, and a transmission unit connecting to the driving shaft; wherein the transmission unit transmits torque of the driving shaft to the output shaft of the testing servo; and
    a control circuit configured to electrically connect to the driving servo and the testing servo; wherein the control circuit drives the driving servo to rotate, and loads angle information of internal sensors of the testing servo and the driving servo.

2. The apparatus for testing the idle position of the servo as claimed in claim 1, wherein the transmission unit comprises:
    a driving gear having a gear shaft; wherein a head of the gear shaft of the driving gear connecting to the driving shaft of the driving servo through a bushing; and
    a driven gear configured to engage with the driving gear; wherein a head of a gear shaft of the driven gear connects to the output shaft of the testing servo through a bushing.

3. The apparatus for testing the idle position of the servo as claimed in claim 2, wherein the bushing is a spline bushing.

4. The apparatus for testing the idle position of the servo as claimed in claim 3, wherein the spline bushing comprises a stopping step mounted in a middle of an inner wall of the spline bushing.

5. The apparatus for testing the idle position of the servo as claimed in claim 2, wherein the apparatus further comprises a box body receiving and supporting the driving gear and the driven gear.

6. The apparatus for testing the idle position of the servo as claimed in claim 5, wherein the box body comprises:
    a first side wall;
    a second side wall opposite to the first side wall;
    wherein the head of the gear shaft of the driving gear pierces out the first side wall;
    wherein the head of the gear shaft of the driven gear pierces out the second side wall.

7. The apparatus for testing the idle position of the servo as claimed in claim 6, wherein the apparatus further comprises:

a first flange configured to be mounted on the first side wall of the box body; wherein the head of the gear shaft of the driving gear is supported by the first flange though a bearing;

a second flange configured to be mounted on the second side wall of the box body;

wherein the head of the gear shaft of the driven gear is supported by the second flange though the bearing.

8. The apparatus for testing the idle position of the servo as claimed in claim 2, wherein a structure between the driving gear and the driving shaft of the transmission unit is the same as a structure between the driven gear and the output shaft.

9. The apparatus for testing the idle position of the servo as claimed in claim 1, wherein the apparatus further comprises:

a support platform, wherein the driving mechanism and the control circuit are arranged on the support platform.

10. A testing system of an idle position of a testing servo, comprising:

the testing servo, an apparatus for testing the idle position of the testing servo, comprising:

a driving mechanism configured to connect to an output shaft of the testing servo, and to drive the output shaft of the testing servo to rotate; wherein the driving mechanism comprises a driving servo having a driving shaft, and a transmission unit connecting to the driving shaft; wherein the transmission unit transmits torque of the driving shaft to the output shaft of the testing servo; and a control circuit configured to electrically connect to the driving servo and the testing servo; wherein the control circuit drives the driving servo to rotate, and loads angle information of internal sensors of the testing servo and the driving servo;

wherein an output shaft of the testing servo connects to the driving mechanism of the apparatus;

wherein inner sensors of the testing servo electrically connects to the control circuit of the apparatus.

11. The testing system of the idle position of the servo as claimed in claim 10, wherein the transmission unit of the apparatus comprises:

a driving gear having a gear shaft; wherein a head of the gear shaft of the driving gear connecting to the driving shaft of the driving servo through a bushing; and a driven gear configured to engage with the driving gear, wherein a head of a gear shaft of the driven gear connects to the output shaft of the testing servo through a bushing.

12. The testing system of the idle position of the servo as claimed in claim 11, wherein the bushing of the apparatus is a spline bushing.

13. The testing system of the idle position of the servo as claimed in claim 12, wherein the spline bushing of the apparatus comprises a stopping step mounted in a middle of an inner wall of the spline bushing.

14. The testing system of the idle position of the servo as claimed in claim 11, wherein the apparatus further comprises a box body receiving and support the driving gear and the driven gear.

15. The testing system of the idle position of the servo as claimed in claim 14, wherein the box body of the apparatus comprises:

a first side wall;

a second side wall opposite to the first side wall;

wherein the head of the gear shaft of the driving gear pierces out the first side wall;

wherein the head of the gear shaft of the driven gear pierces out the second side wall.

16. The testing system of the idle position of the servo as claimed in claim 15, wherein the apparatus further comprises:

a first flange configured to be mounted on the first side wall of the box body; wherein the head of the gear shaft of the driving gear is supported by the first flange though a bearing;

a second flange configured to be mounted on the second side wall of the box body;

wherein the head of the gear shaft of the driven gear is supported by the second flange though the bearing.

17. The testing system of the idle position of the servo as claimed in claim 11, wherein a structure between the driving gear and the driving shaft of the transmission units is the same as a structure between the driven gear and the output shaft.

18. The testing system of the idle position of the servo as claimed in claim 10, wherein the apparatus further comprises:

a support platform, wherein the driving mechanism and the control circuit are arranged on the support platform.

* * * * *